(No Model.)
P. BURNETT.
GRASS CUTTING IMPLEMENT.
No. 451,452. Patented May 5, 1891.
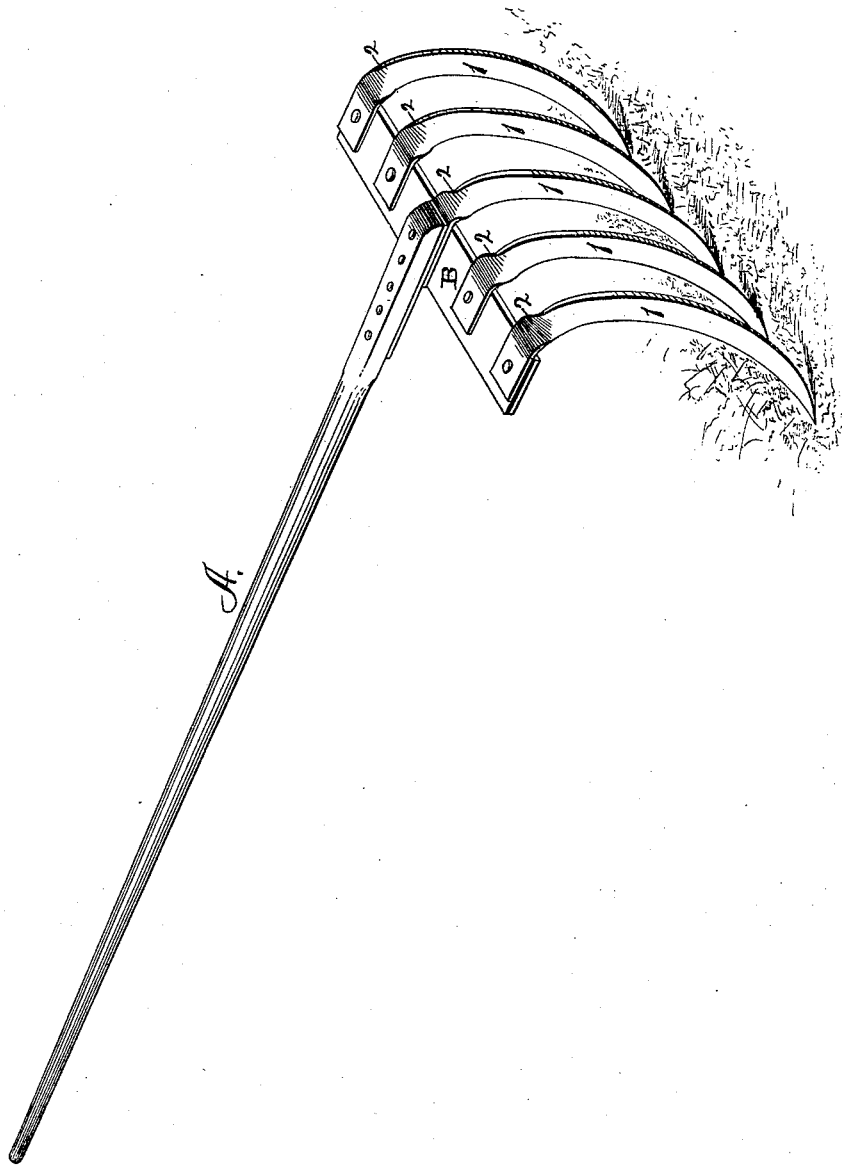
Witnesses
H. A. Carhart,
E. & Mack
Peyton Burnett  Inventor
By his Attorneys
Smith & Denison

UNITED STATES PATENT OFFICE.

PEYTON BURNETT, OF WAUCHULA, FLORIDA.

GRASS-CUTTING IMPLEMENT.

SPECIFICATION forming part of Letters Patent No. 451,452, dated May 5, 1891.

Application filed January 16, 1891. Serial No. 378,049. (No model.)

*To all whom it may concern:*

Be it known that I, PEYTON BURNETT, of Wauchula, in the county of De Soto, in the State of Florida, have invented new and useful Improvements in a Device for Cutting Lodged Grass, of which the following, taken in connection with the accompanying drawings, is a full, clear, and exact description.

My invention relates to devices for cutting swale or lodged grass or grains.

My object is to produce such a device, cheap and durable in construction and of great utility.

My invention consists of the several novel features of construction hereinafter described, and specifically set forth in the claim hereunto annexed. It is constructed as follows, reference being had to the accompanying drawings, in which I show the device complete:

A is the handle, which may be straight, as shown, or curved like any ordinary scythe-handle, if desired, to one end of which is a cross-bar B.

1 1 are multiple scythes twisted at 2, so that they may present a flat surface upon the cross-bar and at the same time have their cutting-edges directly in the line of draft, and they are secured to the cross-pieces in any ordinary manner, as shown.

I am aware that scythes with the single blades are old and well known to the art, but I have discovered that there is great utility in mounting multiple scythe-blades all of the same size upon the common cross-bar and that thereby much labor is saved in cutting lodged grass.

This device may be used by drawing it along in the manner of an ordinary rake, or it may be hooked under the lodged grass or grain and raised vertically or diagonally to suit the convenience of the laborer in performing the work in hand.

What I claim as my invention, and desire to secure by Letters Patent, is—

The combination of a handle A with the cross-bar B, secured thereto, and multiple scythe-knives 1 1, all of the same size, bent at 2, so as to present their cutting-edges in the direct line of draft, and secured to the cross-bar, substantially as described, for the purposes set forth.

In witness whereof I have hereunto set my hand on this 24th day of December, 1890.

PEYTON BURNETT.

In presence of—
JAS. N. CROHAN,
T. J. SPARKMAN.